United States Patent [19]

Nakata et al.

[11] 4,082,933

[45] Apr. 4, 1978

[54] STAB CONNECTOR FOR ENCLOSED ELECTRIC BUS APPARATUS

[75] Inventors: Roy Nakata, Pittsfield, Mass.; Arthur Leo Bohlinger, Newtown Square, Pa.

[73] Assignee: General Electric Company, Philadelphia, Pa.

[21] Appl. No.: 669,794

[22] Filed: Mar. 22, 1976

[51] Int. Cl.² .............................................. H01H 1/38
[52] U.S. Cl. .................................. 200/163; 339/22 B
[58] Field of Search ........................... 339/22 R, 22 B; 200/16 E, 163

[56] References Cited

U.S. PATENT DOCUMENTS

| | | | |
|---|---|---|---|
| 2,229,504 | 1/1941 | Hoye | 200/16 E |
| 3,665,135 | 5/1972 | Boersma | 200/163 |
| 3,761,651 | 2/1973 | Fournier | 200/163 X |
| 3,794,799 | 2/1974 | Spindle et al. | 200/163 |

FOREIGN PATENT DOCUMENTS 344,198    3/1931    United Kingdom ................ 200/163

*Primary Examiner*—Harold Tudor
*Attorney, Agent, or Firm*—William Freedman

[57] ABSTRACT

A stab type isolating connector for offset joints in enclosed high voltage electric bus apparatus comprises a removable contact rod for connecting laterally offset terminal ends of linear bus conductors within an enclosing sheath. The contact rod is slidable through a transverse passage in one terminal end into and out of engagement with a contact socket in the other terminal end, making contact with both terminal ends in its fully engaged position. Preferably the contact rod is tubular and slides over a guide rod secured within the contact socket. The guide rod may be sectional so that after seating of the contact rod a section of the guide rod may be used to secure the contact rod in engaging position.

5 Claims, 5 Drawing Figures

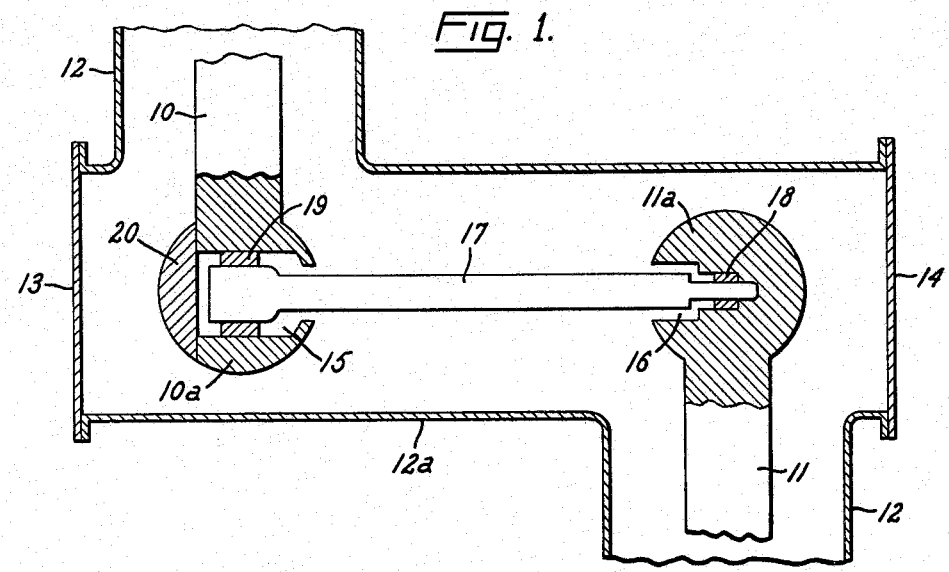
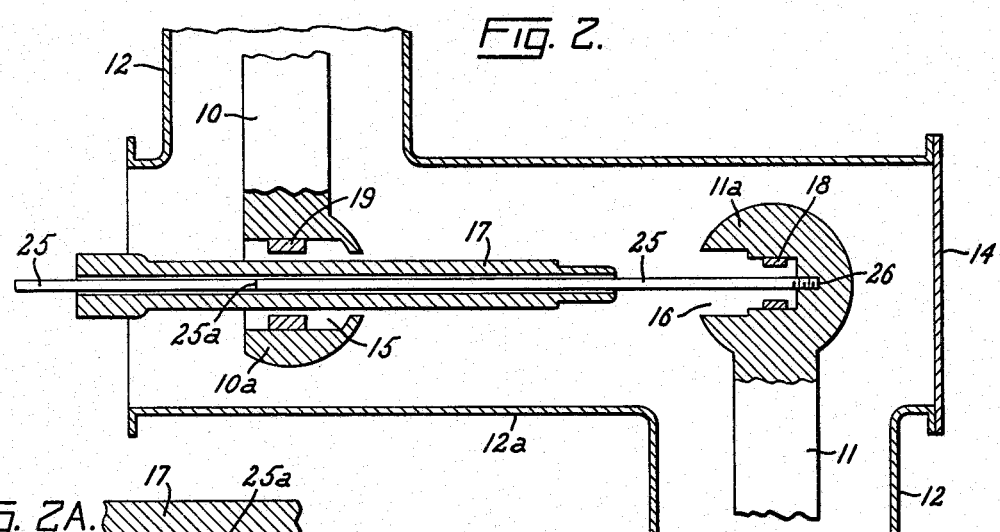
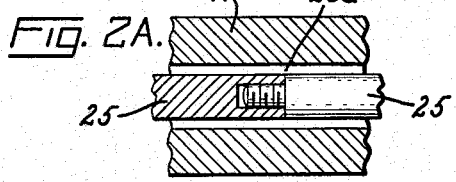
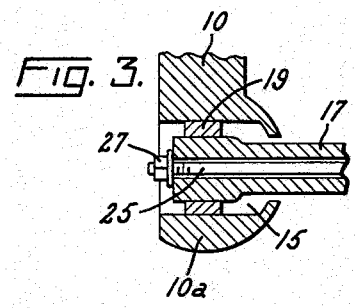
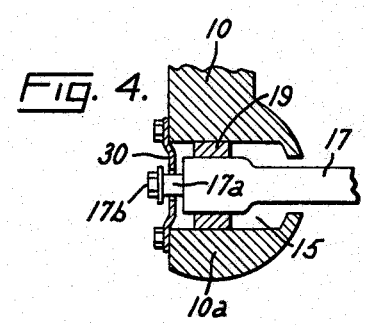

STAB CONNECTOR FOR ENCLOSED ELECTRIC BUS APPARATUS

Our invention relates to removable stab type connectors for selectively providing connection or isolation between a linear conductor and a laterally displaced conductor in enclosed electric bus apparatus. The invention is particularly applicable to offset joints in high voltage electric bus apparatus of the enclosed, gas-insulated type.

During the installation of enclosed electric bus apparatus, and occasionally for investigation of faults, it is necessary to isolate conductor sections. This is usually accomplished by means of a motor driven disconnect switch having an axially movable contact rod mounted at an angular junction in the bus apparatus. Such a switch is expensive and the occasions for its use infrequent. A less expensive isolating means is desirable.

It is therefore a general object of our invention to provide a simple and inexpensive but effective isolating switch between conductor members in enclosed electric bus apparatus.

It is a more particular object of our invention to provide a manually operable stab connector of a design especially adapted for use at an angular joint between conductor parts of enclosed electric bus apparatus.

In carrying out our invention in one preferred embodiment we utilize a removable stab type contact rod between transversely aligned terminal ends of a pair of linear bus conductors disposed in laterally spaced apart relation. The offset joint thus formed is enclosed in an offset tubular sheath, or housing, having an opening with a removable cover in axial alignment with the contact rod to permit manual withdrawal of the rod. The conductor end proximate the housing opening is provided with transverse passage to permit through insertion of the contact rod and is provided with contact means within the passage to engage one end of the rod. In connected position the opposite end of the rod seats in a contact socket in the remote conductor end. Preferably the contact making terminal ends of the conductors are of spherical configuration and the transverse passage in one conductor is provided with a closure cap covering that end of the passage remote from socket in the other conductor. Preferably also the stab contact is tubular for receiving an elongate clamping stud secured at one end in the contact socket and provided at its other end with means for clamping the removable rod in contact making position.

Our invention will be more fully understood and its various objects and advantages further appreciated by referring now to the following detailed specification taken in conjunction with the accompanying drawing in which:

FIG. 1 is an axial cross sectional view of an offset stab joint enclosed electric bus apparatus embodying our invention in one form, FIG. 2 is a view similar to FIG. 1 showing a modified form of our invention, FIG. 2A is an enlarged cross sectional detail of FIG. 2, and FIGS. 3 and 4 are fragmentary cross-sectional views of stab connectors embodying our invention and showing several means for securing the stab contact in contact making position.

Referring now to FIG. 1, we have shown in axial cross-section an offset joint between a pair of linear bus conductors 10 and 11 disposed in parallel, laterally spaced apart relation and having terminal ends 10a, 11a, respectively, in alignment along a transverse axis. The conductor ends 10a, 11a are spherical to minimize electrostatic stress. The conductor end 10a is provided with a transverse passage, or aperture 15, therethrough and the conductor end 11a is provided with a contact socket 16 in alignment with the axes of the passage 15. The conductors 10, 11 are enclosed in coaxial, radially spaced relation within an offset tubular sheath or housing having parallel sections 12 and an intermediate transverse section 12a. The transverse sheath section 12a is provided at opposite axial ends with access apertures covered by removable closure plates 13, 14 laterally adjacent the terminal ends 10a, 11a, respectively.

The conductor terminal ends 10a, 11a at FIG. 1 are electrically connected together by an elongate, electrically conductive and movable contact rod or stab contact 17. At one terminal end the removable stab contact 17 engages fixed contacts 18 within the contact socket 16 and at its opposite terminal end the stab 17 engages fixed contacts 19 within the transverse passage 15. A removable spherical closure cap 20 is provided to cover that end of the passage 15 opposite the socket 16. The contact socket 16, the transverse passage 15, the cap 20 and the cover plate 13 are in alignment along the axis of the contact rod 17. It will be understood that in operation the conductor parts 10 and 11 may be electrically isolated by removing the end cap 20 and the sheath cover plate 13 and then withdrawing the stab contact 17 through the passage 15 and the sheath opening uncovered by the closure plate 13.

While for the purpose of illustration we have shown two linear conductors 10 and 11 in coplanar parallel spaced relation, it will be evident to those skilled in the art as this description proceeds that the invention is equally applicable to connection of any linear conductor member, whether at its end point or elsewhere, to a laterally spaced conductor member of any desired shape or disposition. For example, linear conductor members in parallel planes may be so connected whether or not their axes are both coplanar with the stab contact axis; it is only necessary that the contact socket in a remote conductor lie in the plane determined by a linear conductor and the axis of a transverse passage therethrough.

At FIG. 2 we have shown a modified form of our invention in which parts corresponding to those shown in FIG. 1 have been assigned the same reference numerals, the cap 20 and cover plate 13 being removed. In the embodiment shown at FIG. 2 the stab contact 17 is tubular and is shown partially inserted over a coaxial guide rod 25. The guide rod 25 is preferably somewhat flexible and is secured at one end within the contact socket 16, as by a threaded connection 26. For the purpose of ready insertion or withdrawal of stab contact 17 the guide rod is longer than the stab and extends completely through the transverse passage 15 and beyond the proximate end opening in the transverse sheath section 12a. If the guide rod 25 is integral it must of course be removed from the socket 16 after the stab contact 17 is fully seated in order to place the cap 20 and plate 13 (FIG. 1) in position. Preferably, however, the guide rod 25 is sectionalized at a point 25a within the terminal end 10a as shown in enlarged cross section at FIG. 2A. In FIG. 2A the sections of rod 25 are connected together in longitudinal alignment by means of a threaded stud on that rod section secured in the socket 16. Thus after full insertion of the stab contact 17 the extended end of guide rod 25 may be removed and the remaining inner end utilized as described below.

At FIG. 3 we have shown a detailed cross sectional view of the conductor terminal end 10a with the cap 20 removed. A tubular stab contact 17 is in contact making position over a coaxial guide rod 25 which terminates within the transverse passage 15 and only slightly beyond the associated terminal end of connector 17. In this case the guide rod 25 is secured in socket 16 as at FIG. 2 and provided at its end remote from the socket 16 with a clamping nut 27. The rod 25 thus serves as a stud for clamping the stab contact 17 to the conductor 11 (FIG. 2) while permitting sliding engagement between the stab contact and the aperture contacts 19 to accommodate thermal expansion and contraction of the parts. It may be observed that when the stab contact 17 is bolted in place in contact socket 16, as by the nut 27 of FIG. 3, it may tilt within the contacts 18 and slide within the contacts 19, thereby to permit individual thermal expansion and contraction of parts 10, 11 and 17.

At FIG. 4 we have shown another detailed cross-sectional view of the conductor end 10a wherein the stab contact 17 (whether or not of tubular configuration) is secured in contact making position by bolting it to a strap 30. While the stab contact 17 may be bolted directly to strap 30 we prefer to provide on the contact 17a reduced neck portion 17a which extends through the strap 30 with some degree of axial lost motion. A nut and washer 17b prevents withdrawal from the strap while permitting some axial sliding movement of stab contact 17 within the contacts 19. The strap 30 is removably secured to conductor end 10a within the transverse passage 15 after the stab 17 is fully inserted into its contact making position. By the construction of FIG. 4 the stab contact 17 is thus permitted to tilt in the socket 16 and to slide in the contacts 19 so that parts 10, 11 and 17 are individually free to expand and contract due to changes in temperature.

While we have illustrated only certain preferred embodiments in our invention by way of illustration, many further modifications will occur to those skilled in the art. Accordingly we wish to have it understood that we intend in the appended claims to cover all such modifications as fall within the true spirit and scope of our invention.

What we claim as new and desire to secure by letters patent of the United States is:

1. Enclosed electric bus apparatus comprising: a linear bus conductor having a substantially spherical terminal end provided with a through passage transverse to the axis of said linear bus conductor, fixed contact means within said passage, a second bus conductor laterally spaced from said linear bus conductor and having a contact socket in spaced apart axial alignment with one end of said transverse passage, an enclosing sheath for said bus conductors having an opening in spaced apart axial alignment with the other end of said transverse passage, a removable closure member for said sheath opening, a movable contact rod having two contact making terminal ends, one engageable with said contact socket and the other engageable with said contact means and terminating within said transverse passage when said one terminal end is in contact-making engagement with said contact socket, said rod being axially movable through said transverse passage and sheath opening to make and break electrical connection between said bus conductors, and a removable closure cap for said other end of said transverse passage forming a portion of said spherical terminal end of said linear bus conductor while said contact rod has one terminal end in contact-making engagement with said contact socket.

2. Apparatus according to claim 1 wherein said second bus conductor is linear and said conductors are disposed in parallel planes with terminal ends in axial alignment with said contact rod.

3. Apparatus according to claim 1 wherein said contact rod is tubular and which includes, a stud coaxially and slidably positioned within said contact rod and having one end secured within said contact socket, said stud terminating within said transverse passage, and clamping means engaging said stud within said passage for securing said rod in contact making position in said socket.

4. Apparatus according to claim 1 which includes means within said transverse passage for securing said other terminal end of said contact rod to said linear bus conductor when said rod is in contact rod is in contact making position.

5. Apparatus according to claim 1 wherein said contact rod is tubular, a guide rod is provided extending through said tubular contact rod axially therof, and said contact socket includes means for securing therein one end of said guide rod, said guide rod when secured extending through said transverse passage whereby said tubular contact rod may be slidably moved coaxially over said guide rod into and out of contact making position.

* * * * *